United States Patent
Zhang

(10) Patent No.: US 12,255,492 B2
(45) Date of Patent: Mar. 18, 2025

(54) CENTRALIZED UNINTERRUPTABLE POWER SUPPLY SYSTEM

(71) Applicant: Huawei Digital Power Technologies Co., Ltd., Shenzhen (CN)

(72) Inventor: Chuntao Zhang, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 24 days.

(21) Appl. No.: 17/902,600

(22) Filed: Sep. 2, 2022

(65) Prior Publication Data
US 2023/0074678 A1  Mar. 9, 2023

(51) Int. Cl.
*H02J 9/08* (2006.01)
*H02J 3/32* (2006.01)
*H02J 3/38* (2006.01)
*H02J 9/06* (2006.01)

(52) U.S. Cl.
CPC ............... *H02J 9/08* (2013.01); *H02J 3/32* (2013.01); *H02J 3/381* (2013.01); *H02J 9/062* (2013.01); *H02J 2300/20* (2020.01)

(58) Field of Classification Search
CPC ......... H02J 2300/10–28; H02J 3/28–32; H02J 3/38–50; G06F 1/263
See application file for complete search history.

(56) References Cited

U.S. PATENT DOCUMENTS

| | | | |
|---|---|---|---|
| 5,767,591 A * | 6/1998 | Pinkerton | H02J 9/062 307/64 |
| 10,014,713 B1 * | 7/2018 | Nguyen | H02J 9/061 |
| 10,931,190 B2 | 2/2021 | Mondal | |
| 2015/0214782 A1 | 7/2015 | Alexander | |

(Continued)

FOREIGN PATENT DOCUMENTS

| | | |
|---|---|---|
| CN | 106253465 A | 12/2016 |
| CN | 108134478 A | 6/2018 |

(Continued)

OTHER PUBLICATIONS

Poccia G., "Line-interactive vs online double conversion UPS for IT applications", Mar. 28, 2019, ABB. (Year: 2019).*

*Primary Examiner* — Rexford N Barnie
*Assistant Examiner* — David A Shiao
(74) *Attorney, Agent, or Firm* — WOMBLE BOND DICKINSON (US) LLP

(57) ABSTRACT

This application provides a power supply system. The power supply system includes first switch module, an UPS, and a plurality of power consumption branches. An input end of the first switch module is connected to a plurality of power supply apparatuses. An output end of the first switch module is connected to an input end of the UPS. The first switch module is switched between the plurality of power supply apparatuses to supply power to the UPS. An output end of the UPS is connected to each power consumption branch. The UPS is configured to receive electric energy and input a first voltage to each power consumption branch. Each (Continued)

power consumption branch includes a first transformer module and at least one power consumption load. The first transformer module is configured to convert the first voltage into a second voltage, and then provide the second voltage to the power consumption load.

16 Claims, 9 Drawing Sheets

(56) References Cited

U.S. PATENT DOCUMENTS

| | | | |
|---|---|---|---|
| 2016/0126788 A1 | 5/2016 | Liao et al. | |
| 2016/0204654 A1* | 7/2016 | Mondal | H02J 9/066 307/67 |
| 2016/0359361 A1* | 12/2016 | Tiwari | H02J 9/066 |
| 2017/0117748 A1* | 4/2017 | Mondal | H02J 3/01 |
| 2018/0189432 A1* | 7/2018 | Leslie | G06F 1/189 |
| 2018/0269684 A1 | 9/2018 | Mondal | |
| 2018/0269685 A1* | 9/2018 | Sugeno | H02S 40/32 |
| 2018/0269782 A1* | 9/2018 | Mondal | H02J 9/00 |
| 2018/0309312 A1* | 10/2018 | King | F02N 11/04 |

FOREIGN PATENT DOCUMENTS

| | | |
|---|---|---|
| CN | 110112711 A | 8/2019 |
| CN | 112290659 A | 1/2021 |
| CN | 112673543 A | 4/2021 |
| IN | 106356841 A | 1/2017 |
| JP | 03027734 A | 2/1991 |
| JP | 2000102196 A | 4/2000 |
| JP | 2005354781 A | 12/2005 |
| JP | 2013230063 A | 11/2013 |
| JP | 2020039236 A | 3/2020 |
| WO | 2017122243 A1 | 7/2017 |

\* cited by examiner

CENTRALIZED UNINTERRUPTABLE POWER SUPPLY SYSTEM

CROSS-REFERENCE TO RELATED APPLICATIONS

This application claims priority to Chinese Patent Application No. 202111038537.3, filed on Sep. 6 2021, which is hereby incorporated by reference in its entirety.

TECHNICAL FIELD

This application relates to the field of energy technologies, and in particular, to a power supply system.

BACKGROUND

As shown in FIG. 1, a power supply system in a data center includes a medium voltage cabinet and a plurality of power consumption branches. An input end of the medium voltage cabinet is connected to a power grid and a generator. The medium voltage cabinet may be switched, so that the power grid supplies power to the power supply system, or may be switched, so that the generator supplies power to the power supply system. An output end of the medium voltage cabinet is connected to the plurality of power consumption branches. Each power consumption branch includes a transformer, an input cabinet, an uninterruptible power supply (UPS), and an output cabinet that are connected in series. The UPS may include an energy storage battery. The UPS may be connected to a plurality of loads through the output cabinet. When the power grid is normal, the medium voltage cabinet may be switched, so that the power grid supplies power to the power supply system, and may output, to each power consumption branch, 10 kV electrical energy provided by the power grid. The transformer in the power consumption branch converts 10 kV into 400 V, and outputs 400 V to the input cabinet. The input cabinet usually serves as a switch of the UPS, and may control a connection or disconnection of a path for inputting electrical energy to the UPS. The UPS may provide electrical energy of the power grid to each load through the output cabinet, and the UPS may further store, in the battery, electrical energy provided by the power grid.

When the power grid is faulty, the UPS may provide electrical energy to the generator, to start the generator. The medium voltage cabinet may be switched, so that the generator supplies power to the power supply system. However, in a process of switching from a state in which the power grid supplies power to a state in which the generator supplies power, electrical energy output by the medium voltage cabinet is temporarily interrupted. To ensure that power is uninterruptedly supplied to the load, the battery in the UPS may output electrical energy to supply power to the load. After the medium voltage cabinet is switched, so that the generator supplies power to the power supply system, the battery in the UPS switches from a discharging state to a charged state. After the power grid is restored to normal, the medium voltage cabinet may be switched, so that the power grid supplies power to the power supply system. However, in a process of switching from the state in which the generator supplies power to the state in which the power grid supplies power, the electrical energy output by the medium voltage cabinet is temporarily interrupted. In this case, the battery in the UPS may output electrical energy, to energize the load. After the medium voltage cabinet is switched, so that the power grid supplies power to the power supply system, the battery in the UPS switches from the discharging state to the charged state.

In a process of switching from the state in which the power grid supplies power to the state in which the generator supplies power and a process of switching from the state in which the generator supplies power to the state in which the power grid supplies power, the UPS temporarily provides electrical energy. However, the switching process is short, resulting in a short UPS discharging time period. Therefore, backup duration of the UPS in each power consumption branch is usually five minutes to 16 minutes, and the backup duration is rarely 30 minutes, resulting in low utilization of the UPS in each power consumption branch. In addition, all power consumption branches are usually distributed in different equipment rooms, which is conducive to management of the battery in the UPS. Consequently, there is poor security. In addition, because the transformer in each power consumption branch converts 10 kV into 400 V, and a voltage in a power supply loop for the load is low, a current in the loop is large, and a thick transmission cable needs to be used, resulting in more costs and a larger volume of the power supply system.

SUMMARY

This application provides a power supply system. The power supply system may be of a centralized structure, and one UPS supplies power to a plurality of power consumption branches. In this way, a quantity of UPSs in the power supply system is reduced, utilization of the UPS is high, the UPS is easily managed, monitored, and maintained, and security of the power supply system is improved.

The power supply system may include a first switch module, an uninterruptible power supply UPS, and one or more power consumption branches. An input end of the first switch module is connected to a plurality of power supply apparatuses. An output end of the first switch module is connected to an input end of the UPS. An output end of the UPS is connected to each of the one or more power consumption branches. The first switch module may be switched between the plurality of power supply apparatuses, to supply power to the UPS. The UPS may supply power to each power consumption branch, for example, provide a first voltage. It can be learned that, in the power supply system provided in this application, one UPS supplies power to the plurality of power consumption branches in a centralized manner, without disposing a UPS in each power consumption branch. In this way, the UPS is easily managed, monitored, and maintained. Impact exerted on the power consumption branch when an extreme fault occurs in the UPS can be avoided. It can be learned that the power supply system provided in this application not only includes a small quantity of UPSs, but also has high security.

Different from a UPS having a low voltage processing capability in each power consumption branch in an existing power supply system, the UPS in the power supply system provided in this application may have a medium voltage processing capability, in other words, may process electrical energy at a voltage within a medium voltage range. The UPS may process electrical energy at a voltage with any value in a voltage range of 6 kV to 35 kV. In other words, the first voltage may not exceed 35 kV, and is not less than 6 kV. In an actual application scenario, there may be different particular limitations on the medium voltage range in various countries. For example, a medium voltage range in China is usually from 1 kV to 20 kV. For another example, a medium voltage range in the United States is usually from 2 kV to 15 kV.

In a possible scenario, each power consumption branch may include a first transformer module and one or more power consumption loads. An input end of the first transformer module is connected to the output end of the UPS, and the first transformer module may have a medium voltage-to-low voltage conversion capability. A medium voltage range may be from 6 kV to 35 kV, and a low voltage range may be any value of 100 V to 600 V. For example, the first transformer module may convert the first voltage into a second voltage. The first voltage may be a value that is not more than 35 kV and not less than 6 kV, and the second voltage may be a value that is not more than 600 V and not less than 100 V. It can be learned that the second voltage is less than the first voltage. The second voltage is usually used to supply power to the power consumption load. After the first transformer module converts the first voltage into the second voltage, the second voltage may be provided to the power consumption load in the power consumption branch.

In one embodiment, when the power consumption branch includes a plurality of power consumption loads, the power consumption branch may further include a second switch module, an input end of the second switch module is connected to an output end of the first transformer module, and an output end of the second switch module is connected to the plurality of power consumption loads. The second switch module may provide the second voltage to at least one of the plurality of power consumption loads.

The plurality of power supply apparatuses include at least a first power supply apparatus and a second power supply apparatus. The first switch module may be switched, so that the first power supply apparatus provides electrical energy to the power supply system. Alternatively, the first switch module may be switched, so that the second power supply apparatus provides electrical energy to the power supply system. In some possible scenarios, the first power supply apparatus may be a power grid. The UPS has a high energy scheduling capability. For example, when power consumption power of power consumption loads in the power supply system exceeds power of the power grid, the UPS and the power grid may supply power to the power consumption loads together. For another example, when a quantity of power consumption loads in the power supply system sharply decreases, to avoid impact exerted on the power grid and the power consumption load, the UPS may absorb a part of the power input by the power grid, thereby improving utilization of the UPS in the power supply system.

To ensure that power is uninterruptedly supplied to each power consumption branch, the second power supply apparatus may be an energy conversion apparatus. In other words, the plurality of power supply apparatuses may include the energy conversion apparatus. The energy conversion apparatus may convert non-electrical energy into electrical energy. The UPS may be connected to the energy conversion apparatus, and the UPS may provide driving electrical energy or a driving voltage to the energy conversion apparatus. The energy conversion apparatus may provide electrical energy to the power supply system after being started. The utilization of the UPS may be improved based on such a design embodiment.

In one embodiment, the UPS may include a power transmission branch, a power conversion branch, and an energy storage apparatus. The power transmission branch is connected between the input end of the UPS and the output end of the UPS. The power conversion branch is connected between the energy storage apparatus and the output end of the UPS, and the energy storage apparatus is connected to the power conversion branch. The energy storage apparatus may store electrical energy, and may further output electrical energy to the power conversion branch. The power transmission branch may transmit electrical energy received by the input end of the UPS to the output end of the UPS. The power conversion branch may perform power conversion on the electrical energy output by the energy storage apparatus, and provide, to the energy conversion apparatus, electrical energy obtained through power conversion, to start the energy conversion apparatus based on the electrical energy stored by the UPS. The power conversion branch may further perform power conversion on electrical energy from the output end of the UPS, and provide, to the energy conversion apparatus, electrical energy obtained through power conversion, to provide operating electrical energy to the energy conversion apparatus based on the electrical energy input by the energy conversion apparatus.

The power transmission branch may include a transmission line, and transmit the electrical energy received by the input end of the UPS to the output end of the UPS. The power transmission branch may further include a bidirectional electronic switch, and the bidirectional electronic switch may prevent the electrical energy output by the power transmission branch from flowing back to the first switch module.

The power conversion branch may be of a plurality of structures, to implement functions of the power conversion branch. In one embodiment, the power conversion branch may include a first bidirectional inverter module and a first bidirectional converter module. A first end of the first bidirectional converter module is connected to the energy storage apparatus, a second end of the first bidirectional converter module is connected to a first end of the first bidirectional inverter module, a second end of the first bidirectional inverter module is connected to the output end of the UPS, and a third end of the first bidirectional inverter module is connected to the energy conversion apparatus. The first bidirectional converter module may perform voltage transformation processing on a direct current provided by the energy storage apparatus. The first bidirectional inverter module may convert a direct current output by the first bidirectional converter module into an alternating current, and then output the alternating current to the energy conversion apparatus. The UPS provides driving electrical energy or a driving voltage to the energy conversion apparatus, to improve the utilization of the UPS.

The first bidirectional inverter module may alternatively convert the direct current output by the first bidirectional converter module into an alternating current, and then output the alternating current to the output end of the UPS, so that the UPS supplies power to the power consumption branch. The first bidirectional inverter module may further convert an alternating current from the output end of the UPS into a direct current, and then output the direct current to the first bidirectional converter module. The first bidirectional converter module performs voltage transformation processing on a received direct current, and then outputs, to the energy storage apparatus, a direct current obtained through voltage transformation processing, to charge the energy storage apparatus.

In one embodiment, the power conversion branch may be a second bidirectional converter module, a second bidirectional inverter module, and a second transformer module. A first end of the second bidirectional converter module is connected to the energy storage apparatus, a second end of the second bidirectional converter module is connected to a first end of the second bidirectional inverter module, a second end of the second bidirectional inverter module is connected to a first end of the second transformer module, a third end of the second bidirectional inverter module is connected to the energy conversion apparatus, and a second end of the second transformer module is connected to the output end of the UPS.

The second bidirectional converter module may perform voltage transformation processing on a direct current provided by the energy storage apparatus. The second bidirectional inverter module may convert a direct current provided by the second bidirectional converter module into an alternating current, and then output the alternating current to the energy conversion apparatus, so that the UPS provides driving electrical energy or a driving voltage to the energy conversion apparatus, to improve the utilization of the UPS.

The second bidirectional inverter module may alternatively convert a direct current provided by the second bidirectional converter module into an alternating current, and then output the alternating current to the second transformer module. The second transformer module may perform voltage transformation processing on electrical energy provided by the second bidirectional inverter module, and then output, to the output end of the UPS, electrical energy obtained through voltage transformation processing, so that the UPS supplies power to the power consumption branch. In addition, the second transformer module may further perform voltage transformation processing on electrical energy from the output end of the UPS, and provide, to the second bidirectional inverter module, electrical energy obtained through voltage transformation processing. The second bidirectional inverter module converts an alternating current provided by the second transformer module into a direct current, and then outputs the direct current to the second bidirectional converter module. The second bidirectional converter module may perform voltage transformation processing on a direct current provided by the second bidirectional inverter module, and output, to the energy storage apparatus, a direct current obtained through voltage transformation processing, to charge the energy storage apparatus.

In one embodiment, the power conversion branch may be a direct current-to-direct current conversion module, a direct current-to-alternating current conversion module, an alternating current-to-direct current conversion module, or a third transformer module. A first end of the direct current-to-direct current conversion module is connected to the energy storage apparatus, a second end of the direct current-to-direct current conversion module is connected to a first end of the direct current-to-alternating current conversion module and a first end of the alternating current-to-direct current conversion module, a second end of the direct current-to-alternating current conversion module is connected to a first end of the third transformer module, a third end of the direct current-to-alternating current conversion module is connected to the energy conversion apparatus, a second end of the alternating current-to-direct current conversion module is connected to the first end of the third transformer module, and a second end of the third transformer module is connected to the output end of the UPS.

The direct current-to-direct current conversion module may perform voltage transformation processing on a direct current provided by the energy storage apparatus, and then output, to the direct current-to-alternating current conversion module, a direct current obtained through voltage transformation processing. The third transformer module may perform voltage transformation processing on electrical energy from the output end of the UPS, and then output, to the alternating current-to-direct current conversion module, electrical energy obtained through voltage transformation processing. The alternating current-to-direct current conversion module may convert an alternating current provided by the third transformer module into a direct current, and then output the direct current to the direct current-to-alternating current conversion module. The direct current-to-alternating current conversion module may convert a direct current from the direct current-to-direct current conversion module and/or the alternating current-to-direct current conversion module into an alternating current, and then output the alternating current to the energy conversion apparatus, so that the UPS provides driving electrical energy or a driving voltage to the energy conversion apparatus, to improve the utilization of the UPS.

The direct current-to-current conversion module may alternatively convert a direct current provided by the direct current-to-direct current conversion module into an alternating current, and then output the alternating current to the third transformer module. The third transformer module performs voltage transformation processing on electrical energy provided by the direct current-to-alternating current conversion module, and then outputs, to the output end of the UPS, electrical energy obtained through voltage transformation processing, so that the UPS supplies power to the power consumption branch. In addition, the direct current-to-direct current conversion module may perform voltage transformation processing on a direct current provided by the alternating current-to-direct current conversion module, and then output, to the energy storage apparatus, a direct current obtained through voltage transformation processing, to charge the energy storage apparatus.

The power supply system may further include a renewable energy conversion module. The renewable energy conversion module is connected to the energy storage apparatus, and the renewable energy conversion module is configured to: convert renewable energy into electrical energy, and charge the energy storage apparatus. The power supply system may have high reliability based on such a design embodiment.

The power supply system provided in this embodiment of this application may be applied to a data center scenario. A plurality of power consumption loads in at least one of the plurality of power consumption branches include a refrigeration device. Each power consumption load in a power consumption branch other than the at least one power consumption branch is a server. One UPS supplies power to the plurality of power consumption branches, without disposing a UPS in each power consumption branch. In this way, the UPS is easily managed, monitored, and maintained. Impact exerted on the server when an extreme fault occurs in the UPS may be avoided.

It is clear that a person skilled in the art can make various modifications and variations to this application without departing from the scope of this application. This application is intended to cover these modifications and variations of this application provided that they fall within the scope of protection defined by the following claims and their equivalent technologies.

DESCRIPTION OF EMBODIMENTS

To make the objectives, technical solutions, and advantages of this application clearer, the following further describes this application in detail with reference to the accompanying drawings. It is clear that the described embodiments are merely some rather than all of embodiments of this application. In addition, it should be understood that in description of this application, terms such as "first" and "second" are merely used for distinguishing and description, but should not be understood as indicating or implying relative importance, or should not be understood as indicating or implying a sequence.

Figure 1:
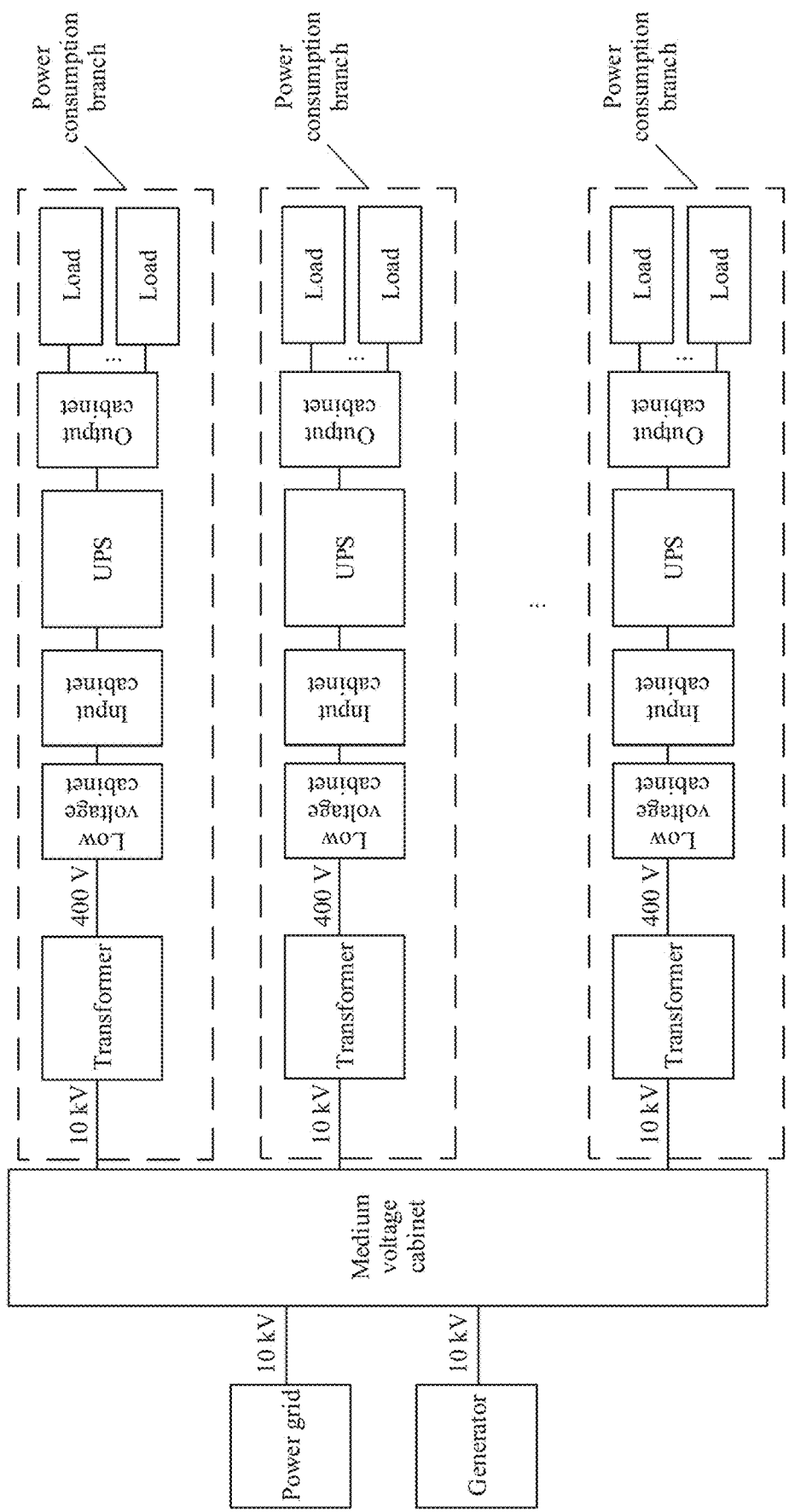
FIG. 1 is a schematic diagram of a structure of a distributed power supply system.

A power supply system in a data center converts a medium voltage of a power grid (or referred to as mains) into a low voltage, and then supplies power to a load in the data center. For example, the power supply system converts 10 kV into 400 V. Usually, to ensure power is uninterruptedly supplied to the load, the power supply system further includes a UPS. When the power grid is faulty, the UPS supplies power to the load. Usually, the power supply system is of a distributed structure. Referring to FIG. 1, the power supply system includes a medium voltage cabinet and a plurality of power consumption branches.

Each power consumption branch includes a transformer, an input cabinet, a UPS, an output cabinet, and a load. The transformer can convert 10 kV into 400 V. It can be learned that the UPS in each power consumption branch has a low voltage (for example, 400 V) processing capability. Usually, each power consumption branch further includes a low voltage cabinet, and the transformer is connected to the input cabinet by using the low voltage cabinet. The low voltage cabinet has a function of connecting the transformer and the input cabinet or disconnecting the transformer from the input cabinet, may supply power to a load such as lighting equipment in the data center, and may further have a function of making power compensation for electrical energy in a power supply loop. The input cabinet has a function of connecting the transformer (or the low voltage cabinet) and the UPS or disconnecting the transformer (or the low voltage cabinet) from the UPS. The output cabinet has a function of connecting each load in each power consumption branch and the UPS or disconnecting each load in each power consumption branch from the UPS.

The power supply system may further include a generator, and when a fault occurs in the power grid, may substitute the power grid to supply power. The medium voltage cabinet may receive electrical energy provided by the power grid, and may receive electrical energy provided by the generator. The medium voltage cabinet may be switched to a state in which the power grid supplies power. In one embodiment, the medium voltage cabinet may receive the electrical energy from the power grid, and output the electrical energy to each power consumption branch. The medium voltage cabinet may alternatively be switched to a state in which the generator supplies power. In one embodiment, the medium voltage cabinet may receive the electrical energy from the generator, and output the electrical energy to each power consumption branch.

In a process of switching between the state in which the power grid supplies power and the state in which the generator supplies power, electrical energy output by the medium voltage cabinet to each power consumption branch may be temporarily interrupted. In this case, an energy storage battery of the UPS in each power consumption branch discharges, and supplies power to the load. After being switched to the state in which the power grid supplies power and the state in which the generator supplies power, the medium voltage cabinet restores outputting of electrical energy, and then the energy storage battery of the UPS stops discharging and performs charging. It can be learned that utilization of a UPS in a distributed power supply system is low. In consideration of costs and a volume of the power supply system, a backup time period of an energy storage battery of each of most UPSs is only five minutes to 15 minutes, and a backup time period of an energy storage battery of each of a small quantity of UPSs may be 30 minutes. In addition, an energy scheduling capability of the energy storage battery is low.

In addition, in each power consumption branch, a large quantity of electronic devices participate in supplying power to the load. Consequently, there are a large current in the power consumption branch, a large energy loss, low power supply efficiency, high power supply costs, and a large volume of the power consumption branch. In addition, the plurality of power consumption branches are usually disposed in different equipment rooms. There are high costs of managing, monitoring, or maintaining devices scattered in various equipment rooms, especially the energy storage battery of the UPS. In addition, if an extreme fault occurs, for example, the energy storage battery is on fire, a device in the equipment room may be affected, and security is poor.

Figure 2:
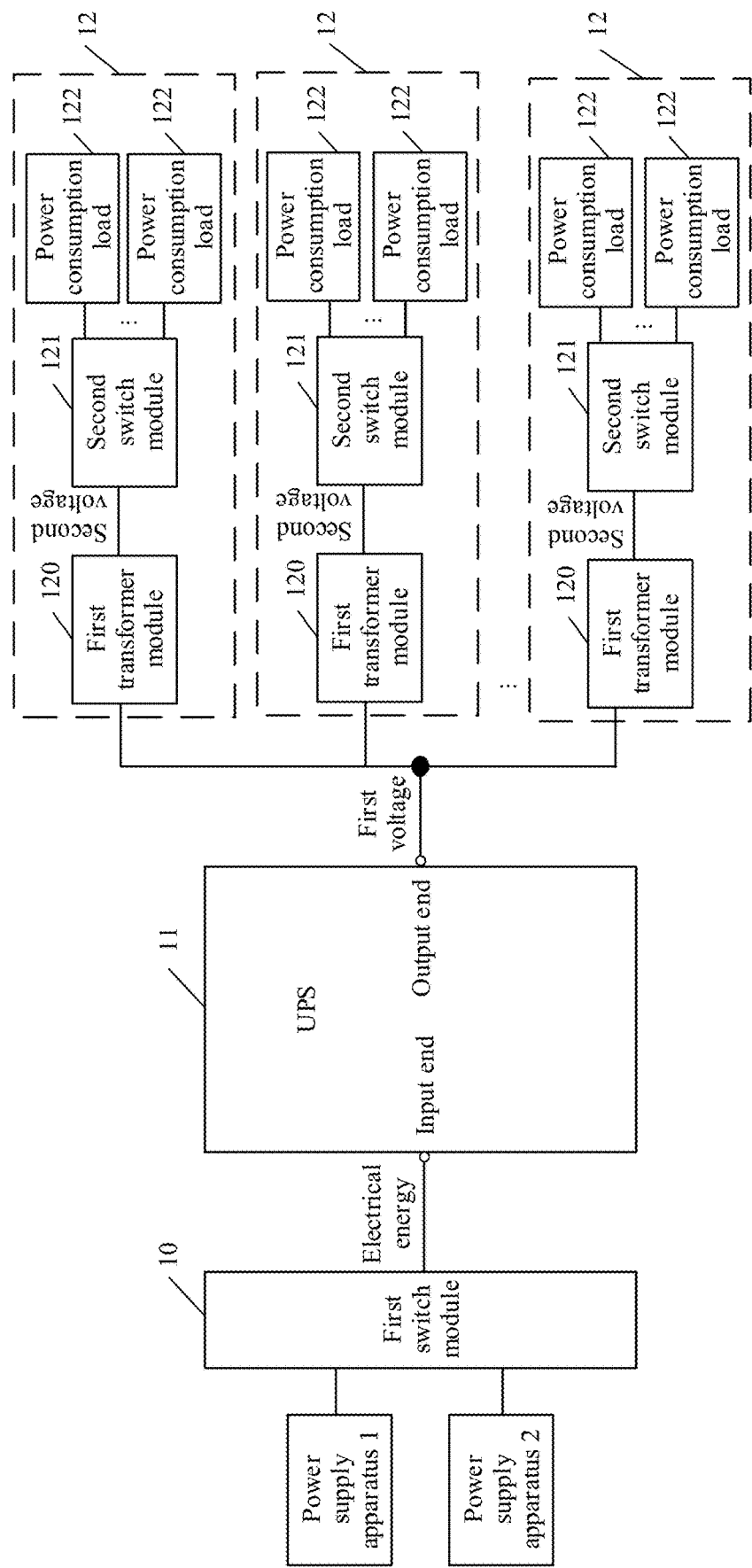
FIG. 2 is a schematic diagram of a structure of a power supply system according to this application.

In view of this, an embodiment of this application provides a power supply system. The power supply system may be of a centralized structure, and one UPS supplies power to a plurality of power consumption branches. In this way, a quantity of UPSs in the power supply system is reduced, utilization of the UPS is high, the UPS is easily managed, monitored, and maintained, and security of the power supply system is improved. Referring to FIG. 2, the power supply system provided in this application may include a first switch module 10, an uninterruptible power supply UPS 11, and one or more power consumption branches 12.

The power supply system may be connected to a plurality of power supply apparatuses, and receive electrical energy provided by the plurality of power supply apparatuses. An input end of the first switch module 10 may be connected to the plurality of power supply apparatuses. An output end of the first switch module 10 may be connected to an input end of the UPS 11. Each power supply apparatus has a function or capability of providing electrical energy. The first switch module 10 may be switched, so that the plurality of power supply apparatuses supply power to the UPS 11. The first switch module 10 may provide, to the UPS 11, electrical energy input by any one of the plurality of power supply apparatuses.

The plurality of power supply apparatuses include at least a power supply apparatus 1 and a power supply apparatus 2. For ease of description of the power supply system, FIG. 2 shows two power supply apparatuses: the power supply apparatus 1 and the power supply apparatus 2, and are not construed as a particular limitation on a quantity of the plurality of power supply apparatuses. In some possible application scenarios, the plurality of power supply apparatuses may be more than two power supply apparatuses.

Usually, each power supply apparatus may provide medium voltage electrical energy to the power supply system. In the power supply system provided in this application, the UPS 11 may have a capability of processing a medium voltage. Usually, a medium voltage range may be from 6 kV to 35 kV, in other words, is not more than 35 kV and not less than 6 kV. Alternatively, a range of a voltage that may be provided by the UPS 11 to each power consumption branch 12 may be from 6 kV to 35 kV. In some possible scenarios, there may be different particular limitations on the medium voltage range and a low voltage range in different countries. For example, a medium voltage range in China is usually from 1 kV to 20 kV, and a low voltage range is usually a voltage less than 1 kV. For another example, a medium voltage range in the United States is usually from 2 kV to 15 kV, and a low voltage range is usually a voltage less than 2 kV.

An output end of the UPS 11 is connected to each of the one or more power consumption branches 12, and may provide electrical energy to each power consumption branch 12. The UPS 11 may receive electrical energy output by the first switch module 10, and provide the electrical energy to each power consumption branch 12, for example, provide a first voltage to each power consumption branch 12. In one embodiment, the first voltage may be any value in a voltage range [6 kV, 35 kV]. Compared with a distributed power supply system, the power consumption branch 12 in the power supply system provided in this application may include a small quantity of electronic devices. Each power consumption branch 12 may include a first switch module 10 and at least one power consumption load 122. An input end of a first transformer module 120 may be connected to the output end of the UPS 11, and may receive medium voltage electrical energy output by the UPS 11. The first transformer module 120 has a medium voltage-to-low voltage conversion capability. In other words, the first transformer module 120 may convert a voltage in the medium voltage range into a voltage in the low voltage range. Usually, the first transformer module 120 may convert the first voltage into a second voltage. The first voltage may be any value in the voltage range [6 kV, 35 kV]. The second voltage may be any value in a voltage range [100 V, 600 V]. In some examples, the first voltage may be 10 kV, and the second voltage may be 400 V. The first transformer module 120 may convert 10 kV output by the UPS 11 into 400 V. The first switch module 10 may convert the first voltage output by the UPS 11 into the second voltage, and then provide the second voltage to the at least one power consumption load in the power consumption branch 12.

In the power supply system provided in this application, the UPS 11 inputs electrical energy to each power consumption branch 12, so that a quantity of electronic devices in each power consumption branch 12 can be reduced. An input cabinet and an output cabinet in a distributed structure do not need to be added to each power consumption branch 12, so that a quantity of devices in each power consumption branch 12 is reduced, a space volume occupied by the power consumption branch 12 is reduced, and a space volume occupied by the power supply system is reduced. Because the quantity of devices in the power consumption branch 12 is small, a current in the power consumption branch 12 is small, a thin transmission cable may be used, costs and occupied space are reduced, and electrical energy transmission efficiency is high. In addition, if one UPS 11 having a medium voltage processing function is used in the power supply system, the UPS 11 is managed, monitored, and maintained at low costs. If an energy storage apparatus 103 in the UPS 11 is faulty, there is a low risk of damaging a device in the power consumption branch 12, so that the power supply system has high security.

In some possible scenarios, for example, when the power consumption branch 12 may include a plurality of power consumption loads 122, referring to FIG. 2, the power consumption branch 12 may further include a second switch module 121. An output end of the first transformer module 120 may be connected to an input end of the second switch module 121, and may perform voltage transformation processing on a voltage output by the UPS 11, and provide, to the second switch module 121, a voltage obtained through voltage transformation processing. An output end of the second switch module 121 is connected to each of the plurality of power consumption loads 122. The second switch module 121 may provide, to at least one of the plurality of power consumption loads 122, electrical energy output by the first transformer module 120. For example, the second switch module 121 may provide the second voltage to all power consumption loads 122 in the power consumption branch 12. The second switch module 121 may alternatively provide the second voltage to some power consumption loads 122. In other words, the second switch module 121 has a gating capability, and may connect the first transformer module 120 and each power consumption load 122 in the power consumption branch 12 or disconnect the first transformer module 120 from each power consumption load 122 in the power consumption branch 12.

In one embodiment, the power supply system may be applied to a data center scenario. A plurality of power consumption loads 122 in at least one power consumption branch 12 in the power supply system may include a refrigeration device and a server, and the refrigeration device may be configured to: dissipate heat for the server, or reduce a temperature of space in which the power consumption branch 12 is located. In some examples, all power consumption loads 122 in the power consumption branch 12 may be servers. In some examples, each power consumption branch 12 may include an electronic device such as lighting equipment. The second switch module 121 may be a low voltage cabinet, and may supply power to an electronic device such as lighting equipment in the power consumption branch 12. The second switch module 121 may have a capability of making power compensation for electrical energy in the power consumption branch 12.

In the foregoing embodiments, the power supply system provided in this application may include a control circuit. The control circuit may control the first switch module 10, the UPS 11, and each power consumption branch 12. For example, an operating state of the first switch module 10 is controlled, an operating state of the UPS 11 is controlled, and an operating state of the first transformer module 120 and an operating state of the second switch module 121 in each power consumption branch 12 are controlled. The control circuit may include one or more controllers (or processors), and the one or more controllers may separately control a module or a device in the power supply system.

The power supply system may further include a fault detection circuit, connected to at least one power supply apparatus, and configured to detect whether a connected power supply apparatus is faulty. After detecting that a target power supply apparatus (any power supply apparatus connected to the fault detection circuit) is faulty, the fault detection circuit sends, to the control circuit, information used to indicate that the target power supply apparatus is faulty. The control circuit controls the operating state of the first switch module 10 based on the information sent by the fault detection circuit, to implement switching, so that a normal power supply apparatus provides electrical energy to the power supply system.

The plurality of power supply apparatuses may include a power grid. For example, the power supply apparatus 1 is a power grid. The fault detection circuit may be connected to the power supply apparatus 1, to detect whether the power supply apparatus 1 is faulty. In the power supply system provided in this application, the UPS 11 may include the energy storage apparatus 103, and the energy storage apparatus 103 may store electrical energy. The energy storage apparatus 103 may output the electrical energy, to supply power to the power consumption branch 12. The control circuit may control the operating state of the UPS 11 based on the information sent by the fault detection circuit, so that the energy storage apparatus 103 provides electrical energy to the power consumption branch 12.

When the power grid is not faulty (in other words, the power grid is normal), the first switch module 10 is switched, so that the power grid supplies power to the power supply system. When the power grid is faulty, the first switch module 10 is switched, so that the power supply apparatus 2 supplies power to the power supply system. In some examples, the first switch module 10 may be a medium voltage cabinet or have a function of the medium voltage cabinet.

When the power grid supplies power to the power supply system, the UPS 11 may charge the energy storage apparatus 103 in a process in which the UPS 11 provides, to each power consumption branch 12, electrical energy input by the power grid. To ensure that power is uninterruptedly supplied to each power consumption branch 12, an energy storage apparatus 103 in a UPS 11 having a medium voltage processing capability has a large electrical energy capacity and a high energy scheduling capability. For example, when a power consumption power of power consumption loads 122 in the power supply system exceeds a power of the power grid, the UPS 11 and the power grid may supply power to the power consumption load 122 together. For another example, when a quantity of power consumption loads 122 in the power supply system sharply decreases, to avoid impact exerted on the power grid and the power consumption load 122, the UPS 11 may absorb a part of the power input by the power grid. In other words, the energy storage apparatus 103 in the UPS 11 may serve as a power consumption load 122, and store a part of electrical energy input by the power grid, to improve utilization of the UPS 11 in the power supply system.

In some possible scenarios, the power supply apparatus 2 may be an energy conversion apparatus 15. The energy conversion apparatus 15 may convert non-electrical energy into electrical energy. It can be learned that the power supply apparatus 2 may generate electrical energy. In some examples, the energy conversion apparatus 15 may be a generator, for example, a diesel generator. Alternatively, the energy conversion apparatus 15 may be a photovoltaic power generation device, a wind power generation device, or the like.

When the power grid is normal, the power grid provides electrical energy to the first switch module 10. The operating state of the first switch module 10 is receiving the electrical energy input by the power grid, and providing, to the UPS 11, the electrical energy input by the power grid. If the power grid is faulty, to ensure that power is uninterruptedly supplied to each power consumption branch 12, the UPS 11 outputs electrical energy stored in the energy storage apparatus 103, and provides the electrical energy to each power consumption branch 12.

When the power grid is faulty, the energy conversion apparatus 15 may provide electrical energy to the first switch module 10. In some examples, power may be supplied by a backup power supply to the energy conversion apparatus 15, and then the energy conversion apparatus 15 is started. In some other examples, the UPS 11 may be connected to the energy conversion apparatus 15, and the UPS 11 may further supply power to the energy conversion apparatus 15, for example, provide operating electrical energy (or voltage) of the energy conversion apparatus 15, to drive the energy conversion apparatus 15 to start. The utilization of the UPS 11 may be improved based on such a design embodiment.

Because the power grid is faulty, the first switch module 10 is switched, so that the energy conversion apparatus 15 provides electrical energy to the first switch module 10. The first switch module 10 may be switched to an operating state of receiving the electrical energy input by the energy conversion apparatus 15 and providing, to the UPS 11, the electrical energy input by the energy conversion apparatus 15. The UPS 11 may output, to each power consumption branch 12, the electrical energy provided by the energy conversion apparatus 15. In this case, the UPS 11 may not output the electrical energy stored in the energy storage apparatus 103, or provide the electrical energy to each power consumption branch 12. Alternatively, the UPS 11 may still output the electrical energy stored in the energy storage apparatus 103, and provide the electrical energy to each power consumption branch 12. Alternatively, the UPS 11 stores electrical energy in the energy storage apparatus 103. It can be learned that, when the power grid is normal, or when the energy conversion apparatus 15 inputs electrical energy into the input end of the first switch module 10, the UPS 11 transmits, to each power consumption branch 12, electrical energy that may be received, and stores the electrical energy in the energy storage apparatus 103.

In some other possible scenarios, operating electrical energy of the power supply apparatus 2 is provided by a renewable energy power generation system. The renewable energy power generation system may include a photovoltaic conversion module or a wind energy conversion module. The photovoltaic conversion module is connected to the power supply apparatus 2, and the photovoltaic conversion module is configured to: convert solar energy into electrical energy, and supply power to the power supply apparatus 2. For example, the photovoltaic conversion module may include components such as a photovoltaic module and a direct current-to-direct current converter. The photovoltaic module may operate in a maximum power point tracking (MPPT) mode. Alternatively, the wind energy conversion module is connected to the power supply apparatus 2, and the wind energy conversion module is configured to: convert wind energy into electrical energy, and supply power to the power supply apparatus 2, so that the power supply apparatus 2 can supply power to the power supply system. For example, when the power grid is faulty, the power supply apparatus 2 supplies power to the power supply system. In some examples, the plurality of power supply apparatuses may include a plurality of power supply apparatuses 2. Electrical energy used by each power supply apparatus 2 to supply power may be provided by the photovoltaic conversion module or the wind energy conversion module.

Figure 3:
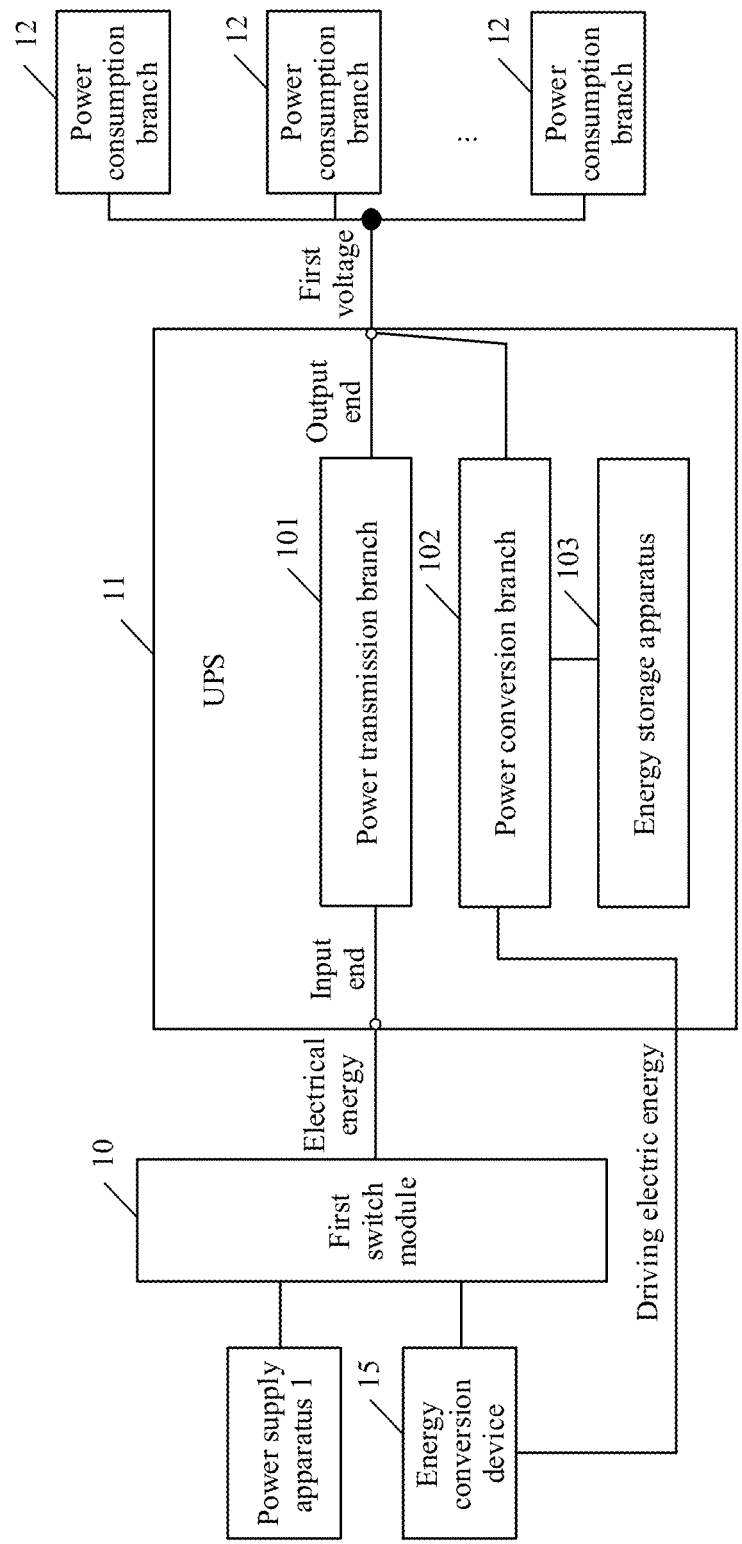
FIG. 3 is a schematic diagram of a structure of a UPS according to this application.

That the power supply apparatus 1 is the power grid and the power supply apparatus 2 is the energy conversion apparatus 15 is used as an example to describe a function or capability of the UPS 11 below with reference to a structure of the UPS 11 having the medium voltage processing capability. In the power supply system provided in this application, the UPS 11 having the medium voltage processing capability may include the energy storage apparatus 103, a power transmission branch 101, and a power conversion branch 102. Referring to FIG. 3, the power transmission branch 101 is connected between the input end of the UPS 11 and the output end of the UPS 11. The power conversion branch 102 is connected between the energy storage apparatus 103 and the output end of the UPS 11. The energy storage apparatus 103 is connected to the power conversion branch 102.

If the power grid is normal, the first switch module 10 may transmit, to the power transmission branch 101 through the input end of the UPS 11, the electrical energy input by the power grid. If the power grid is faulty, the first switch module 10 may transmit, to the power transmission branch 101 through the input end of the UPS 11, the electrical energy input by the energy conversion apparatus 15. The power transmission branch 101 may output, to the output end of the UPS 11, the electrical energy received from the input end of the UPS 11. In this case, the power conversion branch 102 may obtain electrical energy from the output end of the UPS 11, perform power conversion on the obtained electrical energy, and charge the energy storage apparatus 103. The power conversion branch 102 may have an alternating current-to-direct current capability. A power converter may also have a voltage transformation capability.

Figure 4:
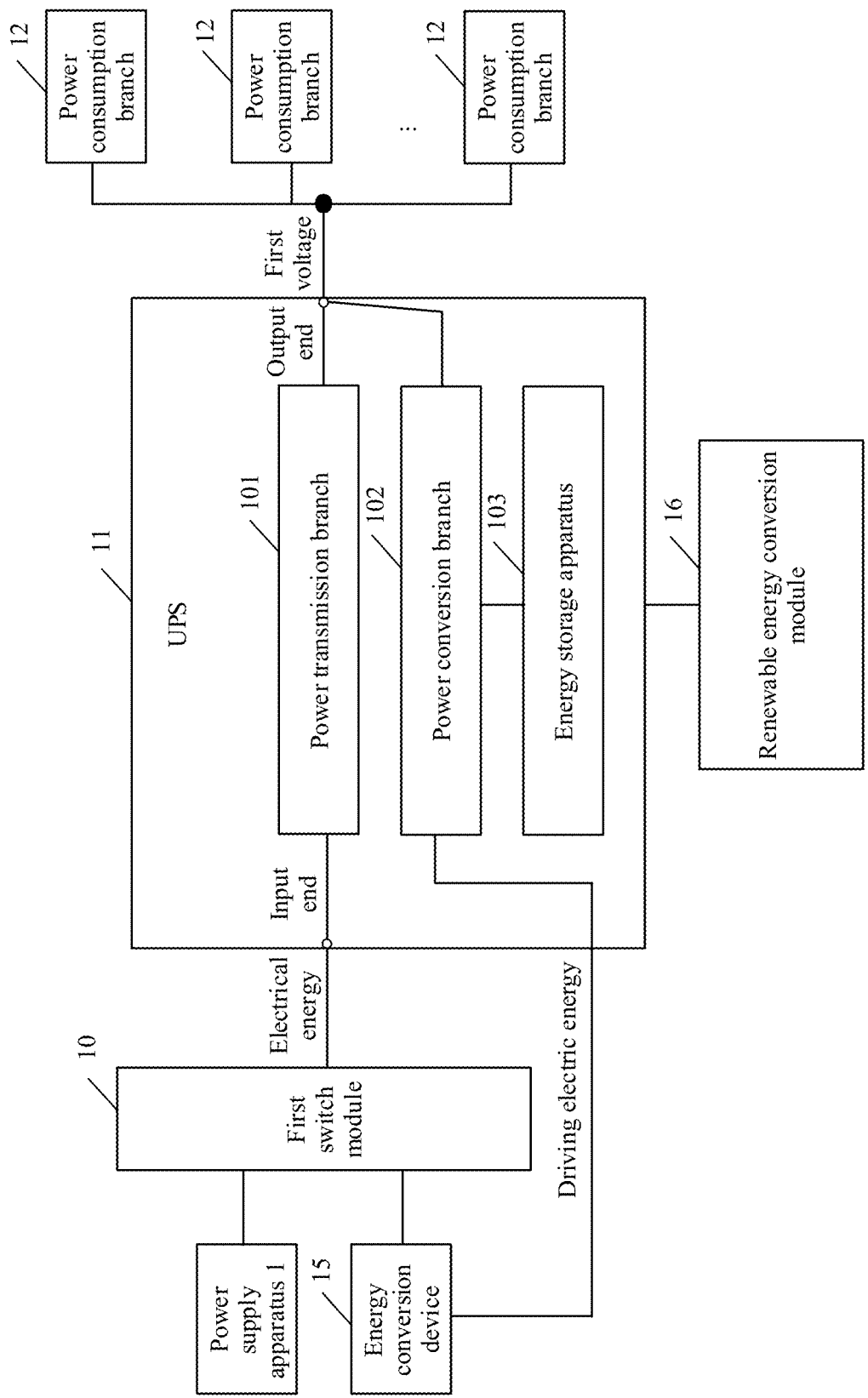
FIG. 4 is a schematic diagram of a structure of a power supply system according to this application.

The electrical energy stored in the energy storage apparatus 103 not only may be provided by the power conversion branch 102, but also may be provided by a module outside the UPS 11. Referring to FIG. 4, the power supply system may include a renewable energy conversion module 16. The renewable energy conversion module 16 may be connected to the energy storage apparatus 103, may convert renewable energy into electrical energy, and charge the energy storage apparatus 103. For example, the renewable energy conversion module 16 may convert solar energy into electrical energy, and may include components such as a photovoltaic module and a direct current-to-direct current converter. The direct current-to-direct current converter may perform voltage transformation processing on a direct current output by the photovoltaic module, or the photovoltaic module may operate in a maximum power point tracking mode, to improve output power of the photovoltaic conversion module. Alternatively, the renewable energy conversion module 16 may convert wind energy into electrical energy, and charge the energy storage apparatus 103.

If the power grid is faulty, electrical energy input by the first switch module 10 to the UPS 11 is interrupted, and the energy storage apparatus 103 in the UPS 11 may output the electrical energy. The power conversion branch 102 may perform power conversion on the electrical energy output by the energy storage apparatus 103, and transmit, to the output end of the UPS 11, electrical energy obtained through power conversion, to uninterruptedly supply power to each power consumption branch 12.

Figure 5:
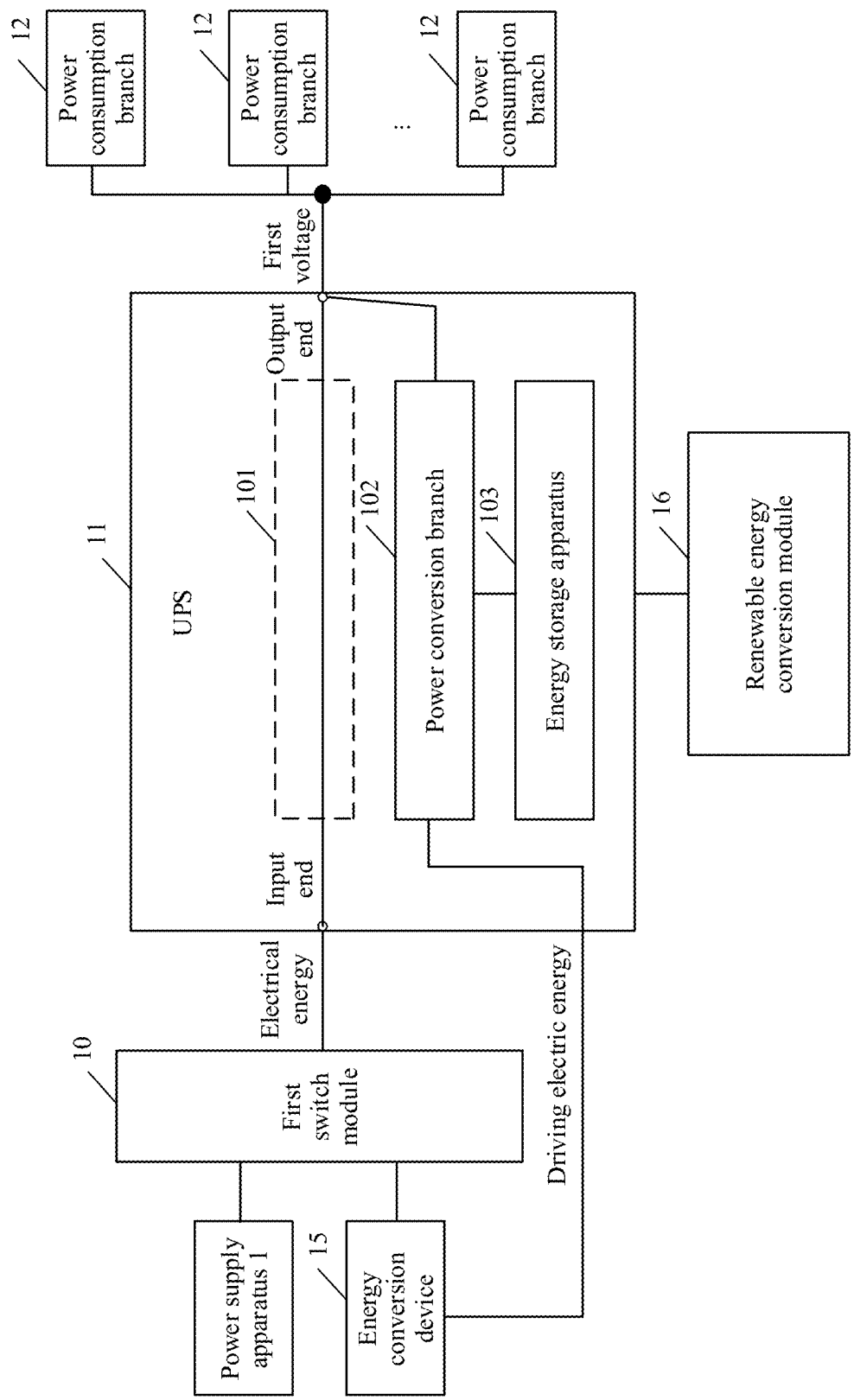
FIG. 5 is a schematic diagram of a structure of a UPS according to this application.
Figure 6:
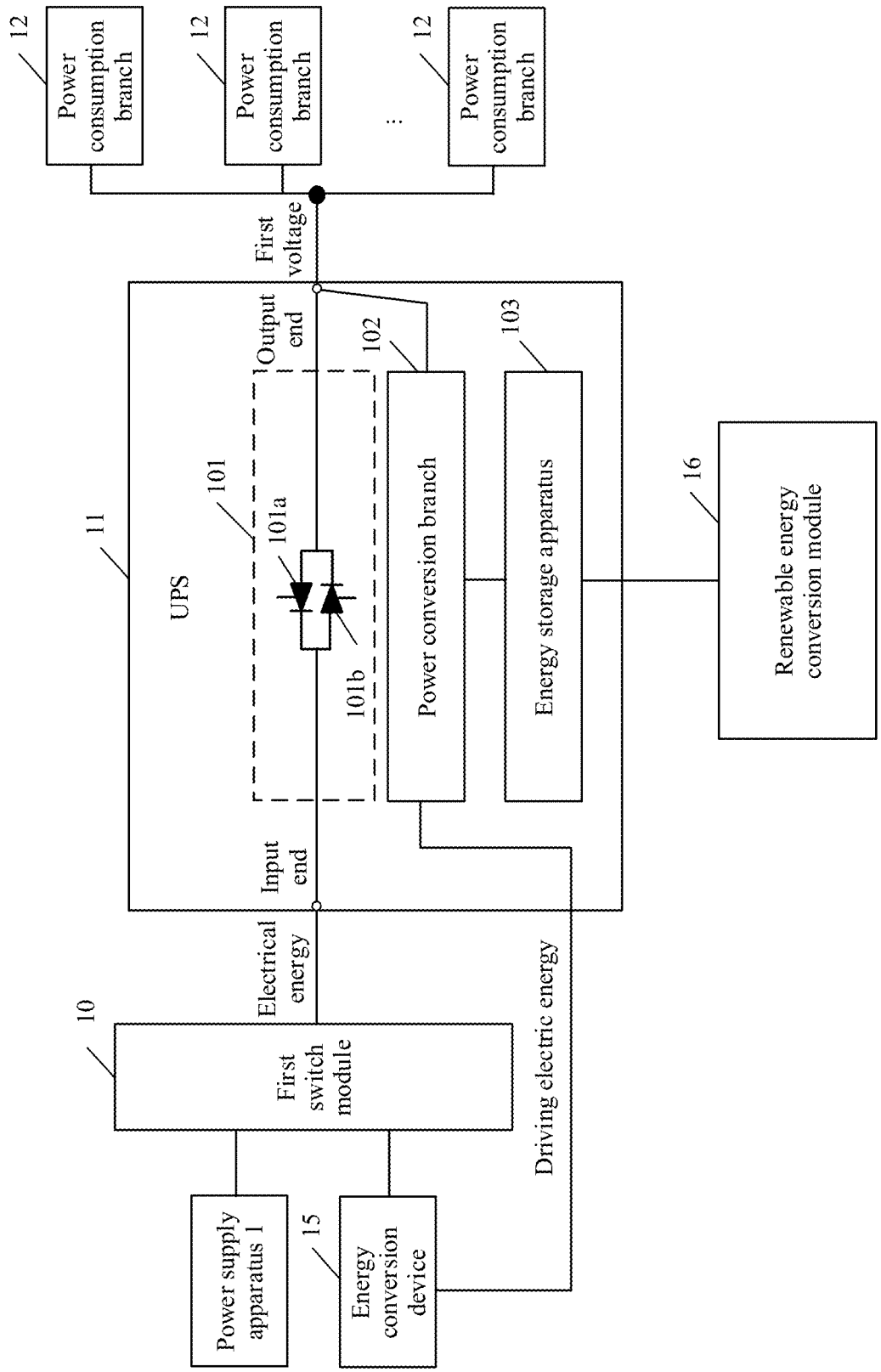
FIG. 6 is a schematic diagram of a structure of a UPS according to this application.

In some examples, the power transmission branch 101 may include a transmission line. Referring to FIG. 5, the transmission line may directly transmit, to the output end of the UPS 11, electrical energy input by the first switch module 10. When the power conversion branch 102 transmits, to the output end of the UPS 11, the electrical energy obtained through power conversion, electrical energy output by the power conversion branch 102 may flow back to the first switch module 10, the power grid, or the power supply apparatus 2 through the transmission line. Therefore, a component having a power isolation function may be added to the power transmission branch 101. Power isolation means that two endpoints of a circuit are isolated, so that no power is transmitted between the two endpoints. The component having the power isolation function may be a switch component. For example, when the switch component is in an open state, a first endpoint connected to an input end of the switch component may be isolated from a second endpoint connected to an output end of the switch component, so that no power is transmitted between the first endpoint and the second endpoint. In some other examples, the power transmission branch 101 may include a transmission line and a bidirectional electronic switch. Referring to FIG. 6, the bidirectional electronic switch may include a first switch 101a and a second switch 101b. The first switch 101a and the second switch 101b each may be a unidirectional operating switch, and unidirectional operating directions of the first switch 101a and the second switch 101b are opposite. In other words, a current direction existing when the first switch 101a is in a closed state is opposite to a current direction existing when the second switch 101b is in a closed state.

Usually, electrical energy input by the first switch module 10 to the input end of the UPS 11 is an alternating current. When the first switch 101a is in an open state, and the second switch 101b is in a closed state, positive half-cycle electrical energy of the alternating current may be transmitted to the output end of the UPS 11. When the first switch 101a is in a closed state, and the second switch 101b is in an open state, negative half-cycle electrical energy of the alternating current may be transmitted to the output end of the UPS 11. When the power conversion branch 102 transmits, to the output end of the UPS 11, the electrical energy obtained through power conversion, both the first switch 101a and the second switch 101b may be in an open state. Based on such a design embodiment, the electrical energy output by the power conversion branch 102 may be prevented from flowing back to the first switch module 10 and the power supply apparatus.

In the foregoing embodiments, when the UPS 11 is connected to the energy conversion apparatus 15, the power conversion branch 102 in the UPS 11 may be connected to the energy conversion apparatus 15. If the power grid is faulty, the energy storage apparatus 103 in the UPS 11 may output electrical energy. The power conversion branch 102 may perform power conversion on the electrical energy output by the energy storage apparatus 103, and provide, to the energy conversion apparatus 15, electrical energy obtained through power conversion. For example, the power conversion branch 102 may convert, into an operating voltage of the energy conversion apparatus 15, a voltage output by the energy storage apparatus 103, and output the operating voltage to the energy conversion apparatus 15, to drive the energy conversion apparatus 15.

After being started, the energy conversion apparatus 15 may substitute the faulty power grid to supply power to the power supply system. The energy conversion apparatus 15 may provide energy to the first switch module 10. The first switch module 10 may be switched, to provide, to the input end of the UPS 11, electrical energy output by the energy conversion apparatus 15. The power transmission branch 101 may transmit, to the output end of the UPS 11, the electrical energy received from the input end of the UPS 11. The power conversion branch 102 may not perform power conversion on the electrical energy output by the energy storage apparatus 103, so that the energy conversion apparatus 15 independently supplies power to each power consumption branch 12. Alternatively, the power conversion branch 102 performs power conversion on the electrical energy output by the energy storage apparatus 103, and transmits, to the output end of the UPS 11, electrical energy obtained through power conversion, so that the energy storage apparatus 103 in the UPS 11 and the energy conversion apparatus supply power to each power consumption branch 12 together.

The power conversion branch 102 in the UPS 11 having the medium voltage processing capability may be of a plurality of structures. The following describes a function or capability of the power conversion branch 102 with reference to a structure example of the power conversion branch 102. Although the following structures of the power conversion branch 102 are shown in this application, the structures are not construed as a particular limitation on the structure of the power conversion branch 102. The power conversion branch 102 may alternatively be of another structure to implement a same function as the power conversion branch 102 in embodiments of this application.

Figure 7:
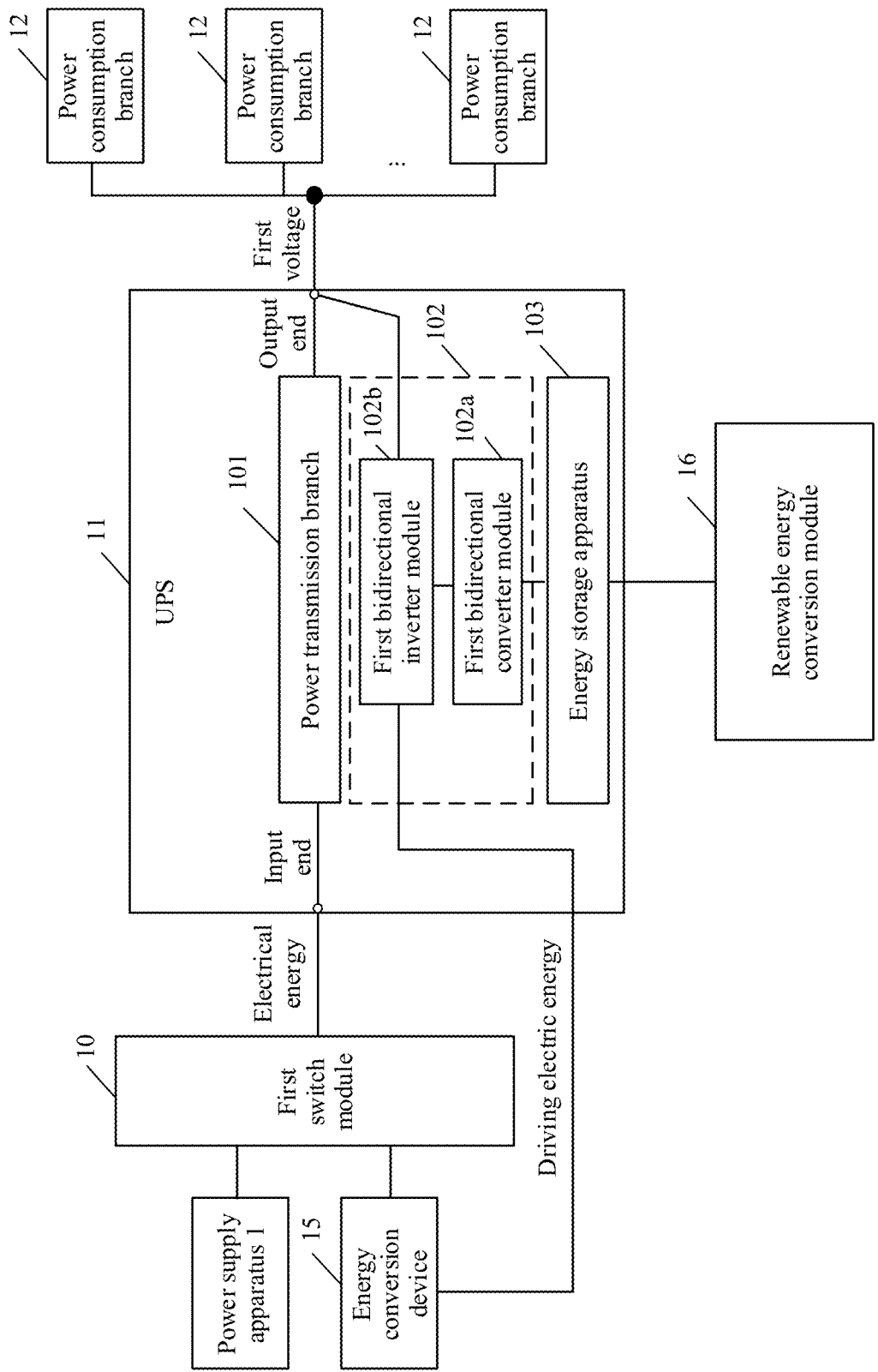
FIG. 7 is a schematic diagram of a structure of a UPS according to this application.

Based on the foregoing embodiments, in one design embodiment, referring to FIG. 7, the power conversion branch 102 may include a first bidirectional converter module 102a and a first bidirectional inverter module 102b. One end of the first bidirectional converter module 102a is connected to the energy storage apparatus 103, the other end of the first bidirectional converter module 102a is connected to one end of the first bidirectional inverter module 102b, and the other end of the first bidirectional inverter module 102b is connected to the output end of the UPS 11.

The first bidirectional inverter module 102b may have a direct current-to-alternating current conversion capability and an alternating current-to-direct current capability, and may be a bidirectional inverter. In some examples, the first bidirectional inverter module 102b may include a rectifier circuit and an inverter circuit. The first bidirectional converter module may further have a capability of performing voltage transformation processing on a direct current, for example, a capability of performing voltage boost processing or voltage buck processing on the direct current.

When the power grid or the energy conversion apparatus 15 supplies power to the power supply system, the energy storage apparatus 103 in the UPS 11 may be in a charged state. In this process, the first bidirectional inverter module 102b may convert an alternating current at the output end of the UPS 11 into a direct current, and output the direct current to the first bidirectional converter module 102a. The first bidirectional converter module 102a may convert, into a charging voltage of the energy storage apparatus 103, a direct current output by the first bidirectional inverter module 102b, and provide the charging voltage to the energy storage apparatus 103.

When the power grid is faulty, the UPS 11 may supply power to each power consumption branch 12. For example, the power conversion branch 102 performs power conversion on the electrical energy output by the energy storage apparatus 103, and transmits, to the output end of the UPS 11, the electrical energy obtained through power conversion. In this process, the first bidirectional converter module 102a may perform voltage transformation processing on a direct current output by the energy storage apparatus 103, and output, to the first bidirectional inverter module 102b, a direct current obtained through voltage transformation processing. The first bidirectional inverter module 102b may convert the direct current obtained through voltage transformation processing into an alternating current, and output the alternating current to the output end of the UPS 11. Usually, a voltage of the alternating current provided by the first bidirectional inverter module 102b to the output end of the UPS 11 is the first voltage, so that the first transformer module 120 in each power consumption branch 12 converts the first voltage into the second voltage (the first voltage may be any value in the medium voltage range, and the second voltage may be any value in the low voltage range).

The first bidirectional inverter module 102b may be connected to the energy conversion apparatus 15. When the power grid is faulty, the UPS 11 may start the energy conversion apparatus 15, for example, provide operating electrical energy or an operating voltage to the energy conversion apparatus 15. The first bidirectional converter module 102a may convert, into the operating voltage of the energy conversion apparatus 15, a voltage of the direct current output by the energy storage apparatus 103, and output the operating voltage to the first bidirectional inverter module 102b. The first bidirectional inverter module 102b may convert, into an alternating current, the direct current output by the first bidirectional converter module 102a, and output the alternating current to the energy conversion apparatus 15. In this embodiment of this application, the UPS 11 may supply power to the energy conversion apparatus 15, for example, provide operating electrical energy (or voltage) of the energy conversion apparatus 15, to drive the energy conversion apparatus 15 to start. The utilization of the UPS 11 may be improved based on such a design embodiment.

Figure 8:
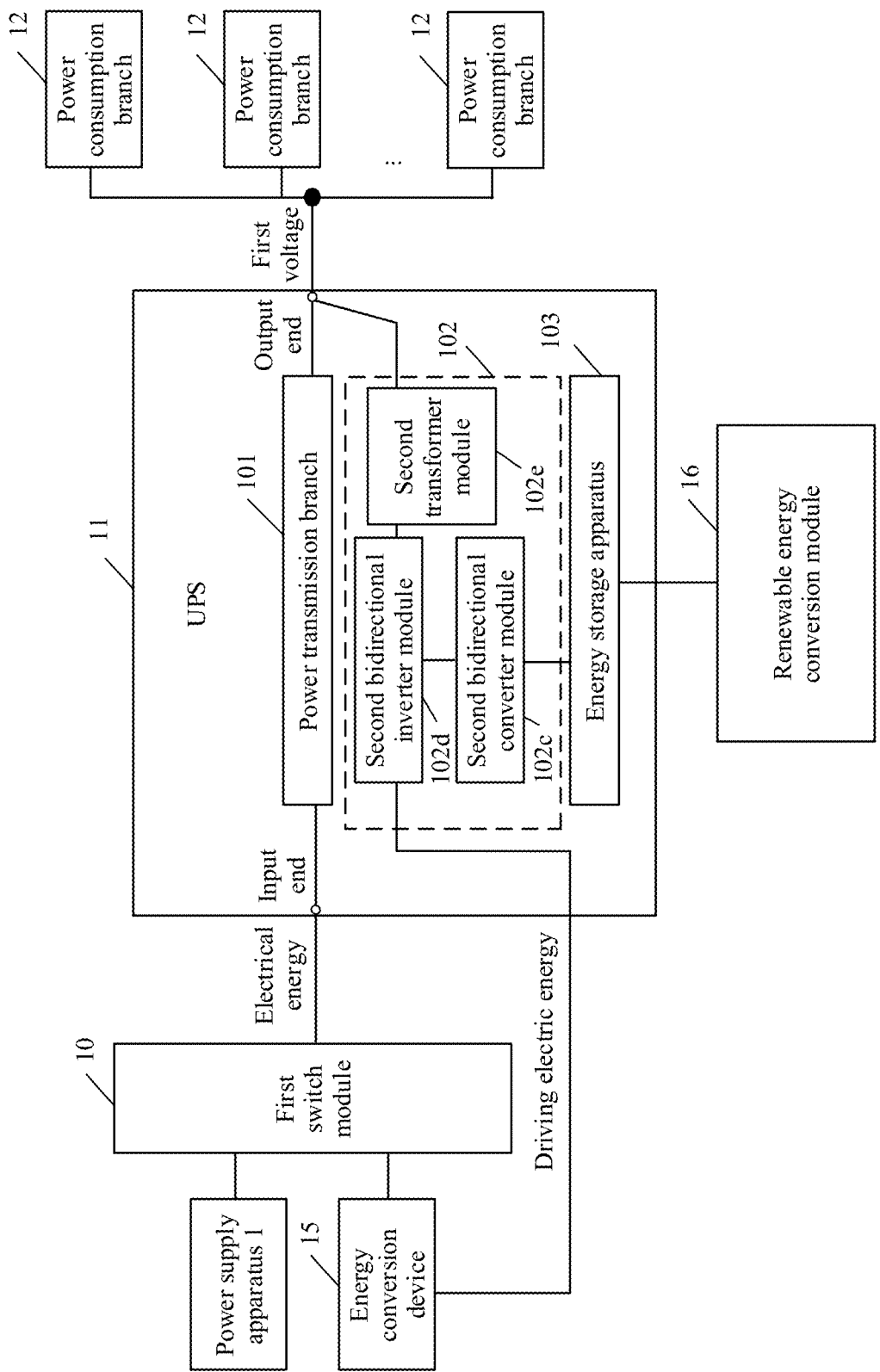
FIG. 8 is a schematic diagram of a structure of a UPS according to this application.

In one embodiment, referring to FIG. 8, the power conversion branch 102 may include a second bidirectional converter module 102c, a second bidirectional inverter module 102d, and a second transformer module 102e. A first end of the second bidirectional converter module 102c is connected to the energy storage apparatus 103, a second end of the second bidirectional converter module 102c is connected to a first end of the second bidirectional inverter module 102d, a second end of the second bidirectional inverter module 102d is connected to a first end of the second transformer module 102e, and a second end of the second transformer module 102e is connected to the output end of the UPS 11.

The second bidirectional inverter module 102d may have a direct current-to-alternating current conversion capability and an alternating current-to-direct current capability. The second bidirectional converter module 102c may have a direct current-to-direct current capability. The second transformer module 102e may perform voltage transformation processing on a voltage of electrical energy obtained from the output end of the UPS 11, and output, to the second bidirectional inverter module 102d, a voltage obtained through voltage transformation processing. Alternatively, the second transformer module 102e performs voltage transformation processing on electrical energy output by the second bidirectional inverter module 102d, and output, to the output end of the UPS 11, a voltage obtained through voltage transformation processing. The second transformer module 102e may be a transformer. Usually, a voltage of electrical energy at the output end of the UPS 11 is a medium voltage. It can be learned that the second transformer module 102e has a medium voltage processing capability, for example, a medium voltage-to-low voltage conversion capability or a low voltage-to-medium voltage conversion capability. Based on such a design embodiment, voltage of electrical energy processed by the second bidirectional inverter module 102d and the second bidirectional converter module 102c may be a low voltage, costs and design difficulty of the second bidirectional inverter module 102d and the second bidirectional converter module 102c are reduced.

When the power grid or the energy conversion apparatus 15 supplies power to the power supply system, the energy storage apparatus 103 in the UPS 11 may be in a charged state. In this process, the second transformer module 102e may perform voltage transformation processing on a voltage of electrical energy obtained from the output end of the UPS 11, and output, to the second bidirectional inverter module 102d, a voltage obtained through voltage transformation processing. The second bidirectional inverter module 102d may convert an alternating current output by the second transformer module 102e into a direct current, and output the direct current to the second bidirectional converter module 102c. The second bidirectional converter module 102c may convert, into a charging voltage of the energy storage apparatus 103, a voltage of a direct current output by the second bidirectional inverter module 102d, and provide the charging voltage to the energy storage apparatus 103, to charge the energy storage apparatus 103.

When the power grid is faulty, the UPS 11 may supply power to each power consumption branch 12. For example, the power conversion branch 102 performs power conversion on the electrical energy output by the energy storage apparatus 103, and transmits, to the output end of the UPS 11, the electrical energy obtained through power conversion. In this process, the second bidirectional converter module 102c may perform voltage transformation processing on the direct current output by the energy storage apparatus 103, and output, to the second bidirectional inverter module 102d, a direct current obtained through voltage transformation processing. A voltage of the direct current obtained through voltage transformation processing is the second voltage (the second voltage may be any value in the low voltage range). Usually, a voltage of the electrical energy output by the energy storage apparatus 103 is a value in the low voltage range. It can be learned that, in this example, the second bidirectional converter module 102c has a low voltage processing capability.

The second bidirectional inverter module 102d may convert the direct current obtained through voltage transformation processing into an alternating current, and output the alternating current to the second voltage change module 102e. The second transformer module 102e may perform voltage transformation processing on an alternating current output by the second bidirectional inverter module 102d, and output, to the output end of the UPS 11, an alternating current obtained through voltage transformation processing. A voltage of the alternating current obtained through voltage transformation processing is the first voltage. Usually, a voltage of the alternating current provided by the second transformer module 102e to the output end of the UPS 11 is the first voltage, so that the first transformer module 120 in each power consumption branch 12 converts the first voltage into the second voltage (the first voltage may be any value in the medium voltage range, and the second voltage may be any value in the low voltage range).

A third end of the second bidirectional inverter module 102d may be connected to the energy conversion apparatus 15. When the power grid is faulty, the UPS 11 may start the energy conversion apparatus 15, for example, provide operating electrical energy or an operating voltage to the energy conversion apparatus 15. In this process, the second bidirectional converter module 102c may convert, into the operating voltage of the energy conversion apparatus 15, a voltage of the direct current output by the energy storage apparatus 103, and output the operating voltage to the second bidirectional inverter module 102d. The second bidirectional inverter module 102d may convert, into an alternating current, the direct current output by the second bidirectional converter module 102c, and output the alternating current to the energy conversion apparatus 15. The UPS 11 may supply power to the power consumption branch 12 when the power grid is faulty, and the second bidirectional inverter module 102d may further convert, into an alternating current, the direct current output by the second bidirectional converter module 102c, and output the alternating current to the energy conversion apparatus 15. In this embodiment of this application, the UPS 11 may supply power to the energy conversion apparatus 15, for example, provide operating electrical energy (or voltage) of the energy conversion apparatus 15, to drive the energy conversion apparatus 15 to start. The utilization of the UPS 11 may be improved based on such a design embodiment.

Figure 9:
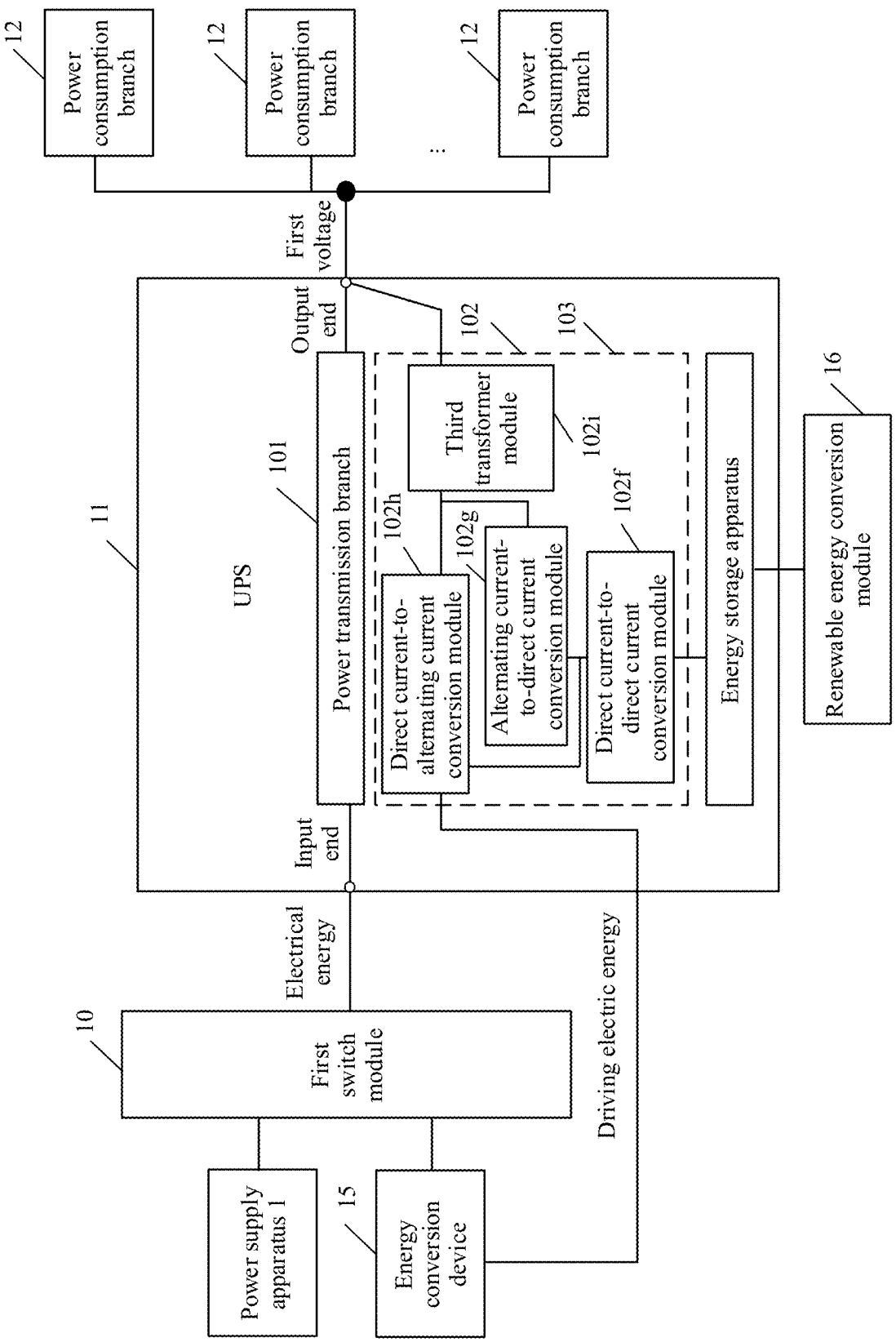
FIG. 9 is a schematic diagram of a structure of a UPS according to this application.

In one embodiment, referring to FIG. 9, the power conversion branch 102 may include a direct current-to-direct current conversion module 102f, an alternating current-to-direct current conversion module 102g, a direct current-to-alternating current conversion module 102h, and a third transformer module 102i. A first end of the direct current-to-direct current conversion module 102f is connected to the energy storage apparatus 103, a second end of the direct current-to-direct current conversion module 102f is connected to a first end of the direct current-to-alternating current conversion module 102h and a first end of the alternating current-to-direct current conversion module 102g, a second end of the direct current-to-alternating current conversion module 102h is connected to a first end of the third transformer module 102i, a third end of the direct current-to-alternating current conversion module 102h is connected to the energy conversion apparatus 15, a second end of the alternating current-to-direct current conversion module 102g is connected to the first end of the third transformer module 102i, and a second end of the third transformer module 102i is connected to the output end of the UPS 11.

The direct current-to-alternating current conversion module 102h has a direct current-to-alternating current conversion capability. The direct current-to-alternating current conversion module 102h may include an inverter circuit or an inverter. The alternating current-to-direct current conversion module 102g converts an alternating current into a direct current, and the alternating current-to-direct current conversion module 102g may include a rectifier circuit or a rectifier. The direct current-to-direct current conversion module 102f may convert a direct current into a direct current, for example, perform voltage boost conversion or voltage buck conversion.

The third transformer module 102i may perform voltage transformation processing on a voltage of electrical energy obtained from the output end of the UPS 11, and output, to the alternating current-to-direct current conversion module 102g, a voltage obtained through voltage transformation processing. Alternatively, the third transformer module 102i performs voltage transformation processing on electrical energy output by the direct current-to-alternating current conversion module 102h, and output, to the output end of the UPS 11, a voltage obtained through voltage transformation processing. The third transformer module 102i may be a transformer. Usually, a voltage of electrical energy at the output end of the UPS 11 is a medium voltage. It can be learned that the third transformer module 102i has a medium voltage processing capability, for example, a medium voltage-to-low voltage conversion capability or a low voltage-to-medium voltage conversion capability. In such a design embodiment, a voltage of electrical energy of each of the direct current-to-direct current conversion module 102f, the direct current-to-alternating current conversion module 102h, and the alternating current-to-direct current conversion module 102g can be a low voltage, and costs and design difficulty of the direct current-to-direct current conversion module 102f, the direct current-to-alternating current conversion module 102h, and the alternating current-to-direct current conversion module 102g are reduced.

When the power grid or the energy conversion apparatus 15 supplies power to the power supply system, the energy storage apparatus 103 in the UPS 11 may be in a charged state. In this process, the third transformer module 102i may perform voltage transformation processing on a voltage of electrical energy obtained from the output end of the UPS 11, and output, to the alternating current-to-direct current conversion module 102g, a voltage obtained through voltage transformation processing. The alternating current-to-direct current conversion module 102g may convert, into a direct current, an alternating current output by the third transformer module 102i, and output the direct current to the direct current-to-direct current conversion module 102f The direct current-to-direct current conversion module 102f may convert, into a charging voltage of the energy storage apparatus 103, a voltage of a direct current output by the alternating current-to-direct current conversion module 102g, and provide the charging voltage to the energy storage apparatus 103, to charge the energy storage apparatus 103.

When the power grid is faulty, the UPS 11 may supply power to each power consumption branch 12. For example, the power conversion branch 102 performs power conversion on the electrical energy output by the energy storage apparatus 103, and transmits, to the output end of the UPS 11, the electrical energy obtained through power conversion. In this process, the direct current-to-direct current conversion module 102f may perform voltage transformation processing on a direct current output by the energy storage apparatus 103, and output, to the direct current-to-alternating current conversion module 102h, a direct current obtained through voltage transformation processing. A voltage of the direct current obtained through voltage transformation processing may be the second voltage. (The second voltage may be any value in the low voltage range.) Usually, a voltage of the electrical energy output by the energy storage apparatus 103 is a value in the low voltage range. It can be learned that in this example, the direct current-to-direct current conversion module 102f may have a low voltage processing capability. The direct current-to-alternating current conversion module 102h may convert the direct current obtained through voltage transformation processing into an alternating current, and output the alternating current to the third transformer module 102i. The third transformer module 102i may perform voltage transformation processing on the alternating current output by the direct current-to-alternating current conversion module 102h, and output, to the output end of the UPS 11, an alternating current obtained through voltage transformation processing. Usually, a voltage of the alternating current provided by the third transformer module 102i to the output end of the UPS 11 is the first voltage, so that the first transformer module 120 in each power consumption branch 12 converts the first voltage into the second voltage (the first voltage may be any value in the medium voltage range, and the second voltage may be any value in the low voltage range).

The direct current-to-alternating current conversion module 102h is connected to the energy conversion apparatus 15. When the power grid is faulty, the UPS 11 may start the energy conversion apparatus 15, for example, provide operating electrical energy or an operating voltage to the energy conversion apparatus 15. In this process, the direct current-to-direct current conversion module 102f may convert, into the operating voltage of the energy conversion apparatus 15, a voltage of the direct current output by the energy storage apparatus 103, and output the operating voltage to the direct current-to-alternating current conversion module 102h. The direct current-to-alternating current conversion module 102h may convert, into an alternating current, a direct current output by the direct current-to-direct current conversion module 102f, and output the alternating current to the energy conversion apparatus 15. After being started, the energy conversion apparatus 15 may supply power to the power supply system. The third transformer module 102i may perform voltage transformation processing on the electrical energy from the output end of the UPS 11, and then output, to the alternating current-to-direct current conversion module 102g, electrical energy obtained through voltage transformation processing. The alternating current-to-direct current conversion module 102g may convert, into a direct current, an alternating current provided by the third transformer module 102i, and then output the direct current to the direct current-to-alternating current conversion module 102h. The direct current-to-alternating current conversion module 102h may receive the direct current output by each of the direct current-to-direct current conversion module 102f and the alternating current-to-direct current conversion module 102g. The direct current-to-alternating current conversion module 102h may convert the received direct current into an alternating current, and output the alternating current to the energy conversion apparatus 15. In this embodiment of this application, the UPS 11 may supply power to the energy conversion apparatus 15, for example, provide operating electrical energy (or voltage) of the energy conversion apparatus 15, to drive the energy conversion apparatus 15 to start. The utilization of the UPS 11 may be improved based on such a design embodiment.

The foregoing descriptions are merely example embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A power supply system comprising:
a first switch module;
an uninterruptible power supply (UPS); and
one or more power consumption branches, wherein
the UPS comprises an energy storage apparatus and a power conversion branch, the power conversion branch comprising a first bidirectional inverter module and a first bidirectional converter module;

the first bidirectional converter module, via a first end, receives a first direct current directly from the energy storage apparatus and performs voltage transformation processing on the first direct current to produce a second direct current obtained through the voltage transformation;

the first bidirectional inverter module, via a first end, receives directly from a second end of the first bidirectional converter module, the second direct current and converts the second direct current into an alternating current and provides, via a third end, the alternating current directly to drive an energy conversion apparatus configured to convert non-electrical energy into electrical energy to operate;

a respective input end of the first switch module are connected to a plurality of power supply apparatuses, including the energy conversion apparatus, an output end of the first switch module is connected to an input end of the UPS, and the first switch module is switched between the plurality of power supply apparatuses to supply power to the UPS;

an output end of the UPS is connected to each of the one or more power consumption branches, and the UPS is configured to receive electric energy from the first switch module and output a first voltage to each power consumption branch;

each power consumption branch includes a first transformer module and at least one power consumption load;

an input end of the first transformer module is connected to the output end of the UPS, and the first transformer module is configured to convert the first voltage into a second voltage and then provide the second voltage to the at least one power consumption load, wherein the second voltage is less than the first voltage; and wherein the first bidirectional inverter module receives, via a second end, a first alternating current from the output end of the UPS and converts the first alternating current into a third direct current to provide directly to the first bidirectional converter module, and converts the second direct current into a second alternating current to provide via the second end to the output end of the UPS.

2. The power supply system according to claim 1, wherein, the UPS comprises a power transmission branch that is connected between the input end of the UPS and the output end of the UPS; and the power transmission branch is configured to transmit electrical energy received by the input end of the UPS to the output end of the UPS.

3. The power supply system according to claim 2, wherein, the power transmission branch comprises a transmission line.

4. The power supply system according to claim 3, wherein, the power transmission branch further comprises a bidirectional electronic switch, and the bidirectional electronic switch is configured to prevent the electrical energy output by the power transmission branch from flowing back to the first switch module.

5. The power supply system according to claim 4, wherein, the power supply system further comprises a renewable energy conversion module, the renewable energy conversion module is connected to the energy storage apparatus, and the renewable energy conversion module is configured to: convert renewable energy into electrical energy, and charge the energy storage apparatus.

6. The power supply system according to claim 3, wherein the first bidirectional converter module converts the third direct current into a charging voltage and provides the charging voltage to the energy storage apparatus.

7. The power supply system according to claim 3, wherein, the power conversion branch comprises a second transformer module, wherein, a second end of the first bidirectional inverter module is connected to a first end of the second transformer module, and a second end of the second transformer module is connected to the output end of the UPS; and the second transformer module is configured to perform voltage transformation processing on electrical energy provided by the first bidirectional inverter module, and then output, to the output end of the UPS, electrical energy obtained through voltage transformation processing.

8. The power supply system according to claim 3, wherein, the power supply system further comprises a renewable energy conversion module, the renewable energy conversion module is connected to the energy storage apparatus, and the renewable energy conversion module is configured to: convert renewable energy into electrical energy, and charge the energy storage apparatus.

9. The power supply system according to claim 2, wherein, the power conversion branch comprises a second transformer module, wherein, a second end of the first bidirectional inverter module is connected to a first end of the second transformer module, and a second end of the second transformer module is connected to the output end of the UPS; and the second transformer module is configured to perform voltage transformation processing on electrical energy provided by the first bidirectional inverter module, and then output, to the output end of the UPS, electrical energy obtained through voltage transformation processing.

10. The power supply system according to claim 9, wherein, the power supply system further comprises a renewable energy conversion module, the renewable energy conversion module is connected to the energy storage apparatus, and the renewable energy conversion module is configured to: convert renewable energy into electrical energy, and charge the energy storage apparatus.

11. The power supply system according to claim 2, wherein, the power supply system further comprises a renewable energy conversion module, the renewable energy conversion module is connected to the energy storage apparatus, and the renewable energy conversion module is configured to: convert renewable energy into electrical energy, and charge the energy storage apparatus.

12. The power supply system according to claim 1, wherein, the first bidirectional converter module converts the third direct current into a charging voltage and provides the charging voltage to the energy storage apparatus.

13. The power supply system according to claim 12, wherein, the power supply system further comprises a renewable energy conversion module, the renewable energy conversion module is connected to the energy storage apparatus, and the renewable energy conversion module is configured to: convert renewable energy into electrical energy, and charge the energy storage apparatus.

14. The power supply system according to claim 1, wherein, the first voltage does not exceed 35 kV and is not less than 6 kV; and the second voltage does not exceed 600 V and is not less than 100 V.

15. The power supply system according to claim 1, wherein at least one power consumption load in at least one power consumption branch comprises a refrigeration device.

16. The power supply system according to claim 15, wherein the at least one power consumption load further comprises a server.

* * * * *

UNITED STATES PATENT AND TRADEMARK OFFICE
CERTIFICATE OF CORRECTION

| | | |
|---|---|---|
| PATENT NO. | : 12,255,492 B2 | Page 1 of 1 |
| APPLICATION NO. | : 17/902600 | |
| DATED | : March 18, 2025 | |
| INVENTOR(S) | : Chuntao Zhang | |

It is certified that error appears in the above-identified patent and that said Letters Patent is hereby corrected as shown below:

On the Title Page

In item [30] under the Foreign Application Priority Data, at Line 1, please insert --September 6, 2021 (CN) 2021110385373--.

Signed and Sealed this
Thirtieth Day of September, 2025

John A. Squires
*Director of the United States Patent and Trademark Office*